(12) United States Patent
LaBerge et al.

(10) Patent No.: US 10,742,556 B2
(45) Date of Patent: *Aug. 11, 2020

(54) TACTICAL TRAFFIC ENGINEERING BASED ON SEGMENT ROUTING POLICIES

(71) Applicant: CISCO TECHNOLOGY, INC., San Jose, CA (US)

(72) Inventors: Tim LaBerge, Sammamish, WA (US); Clarence Filsfils, Brussels (BE); Pierre Jean Rene Francois, Trento (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,525

(22) Filed: Dec. 21, 2018

(65) Prior Publication Data

US 2019/0158406 A1    May 23, 2019

Related U.S. Application Data

(63) Continuation of application No. 15/345,049, filed on Nov. 7, 2016, now Pat. No. 10,212,088.

(51) Int. Cl.
| | |
|---|---|
| *H04L 12/803* | (2013.01) |
| *H04L 12/751* | (2013.01) |
| *H04L 12/851* | (2013.01) |
| *H04L 12/721* | (2013.01) |
| *H04L 12/801* | (2013.01) |
| *H04L 12/911* | (2013.01) |

(52) U.S. Cl.
CPC ............ *H04L 47/125* (2013.01); *H04L 45/02* (2013.01); *H04L 45/44* (2013.01); *H04L 47/122* (2013.01); *H04L 47/13* (2013.01); *H04L 47/2425* (2013.01); *H04L 47/825* (2013.01)

(58) Field of Classification Search
None
See application file for complete search history.

(56) References Cited

U.S. PATENT DOCUMENTS

| | | | |
|---|---|---|---|
| 2014/0269422 A1* | 9/2014 | Filsfils | H04L 45/12 370/254 |
| 2015/0117203 A1* | 4/2015 | Filsfils | H04L 47/122 370/235 |
| 2017/0346691 A1* | 11/2017 | Crickett | H04L 41/12 |

* cited by examiner

*Primary Examiner* — Rebecca E Song
(74) *Attorney, Agent, or Firm* — Cindy Kaplan

(57) ABSTRACT

In one embodiment, a method includes monitoring traffic in a Segment Routing (SR) network through a collection of a Segment Routing Demand Matrix (SRDM) at a Traffic Engineering (TE) system operating at a network device, receiving topology information for the SR network at the TE system, modeling the SR network based on the topology information and the SRDM at the TE system, identifying a violation of a constraint in the SR network at the TE system, and running an optimization algorithm for SR optimization of constraints in the SR network at the TE system, wherein the optimization comprises limiting a number of Segment Identifiers (SIDs) used in a SR policy implemented to resolve the constraint violation. An apparatus is also disclosed herein.

20 Claims, 5 Drawing Sheets

US 10,742,556 B2

TACTICAL TRAFFIC ENGINEERING BASED ON SEGMENT ROUTING POLICIES

STATEMENT OF RELATED APPLICATION

The present application is a continuation of U.S. patent application Ser. No. 15/345,049, entitled TACTICAL TRAFFIC ENGINEERING BASED ON SEGMENT ROUTING POLICIES filed Nov. 7, 2016. The content of this application is incorporated herein by reference in its entirety.

TECHNICAL FIELD

The present disclosure relates generally to communication networks, and more particularly, to traffic engineering.

BACKGROUND

Traffic Engineering (TE) involves measurement, characterization, modeling, and control of network traffic. In conventional systems, TE includes either deploying a full mesh of RSVP-TE (Resource Reservation Protocol-Traffic Engineering) tunnels (for global traffic optimization) or manually deploying a small number of RSVP-TE tunnels for tactical optimization. Since tactical TE deployment is largely a manual process, operators often overprovision networks, both in terms of capacity and path diversity, to minimize the possibility of failure induced SLA (Service Level Agreement) violations.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
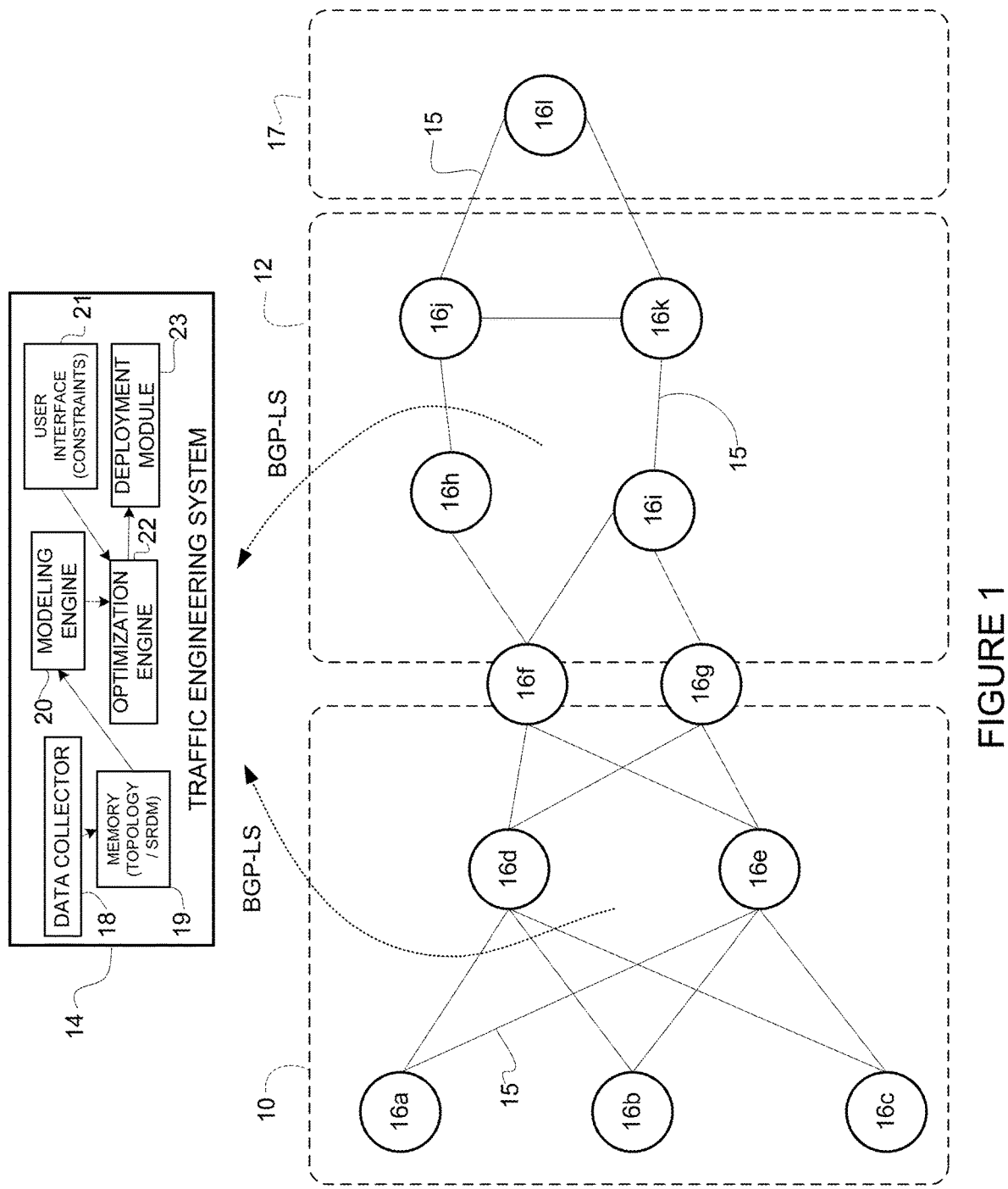
FIG. 1 illustrates an example of a network in which embodiments described herein may be implemented.

In one embodiment, a method includes monitoring traffic in a Segment Routing (SR) network through collection of a Segment Routing Demand Matrix (SRDM) at a Traffic Engineering (TE) system operating at a network device, receiving topology information for the SR network at the TE system, modeling the SR network based on the topology information and the SRDM at the TE system, identifying a violation of a constraint in the SR network at the TE system, and running an optimization algorithm for SR optimization of constraints in the SR network at the TE system. The optimization comprises limiting a number of Segment Identifiers (SIDs) used in a SR policy implemented to resolve the constraint violation.

In another embodiment, an apparatus comprises interfaces for receiving traffic and topology information in a Segment Routing (SR) network, memory for storing said traffic and topology information including traffic demands calculated from a Segment Routing Demand Matrix (SRDM), and a processor for modeling the SR network based on the topology information and the SRDM, identifying a violation of a constraint in the SR network, and running an optimization algorithm for SR optimization of constraints in the SR network. The SR optimization comprises limiting a number of Segment Identifiers (SIDs) used in a SR policy implemented to resolve the constraint violation.

In yet another embodiment, logic is encoded on one or more non-transitory computer readable media for execution and when executed operable to monitor traffic in a Segment Routing (SR) network through collection of a Segment Routing Demand Matrix (SRDM) at a Traffic Engineering (TE) system, process topology information for the SR network at the TE system, model the SR network based on the topology information and the SRDM at the TE system, identify a violation of a constraint in the SR network at the TE system, and run an optimization algorithm for SR optimization of constraints in the SR network at the TE system. The optimization comprises limiting a number of Segment Identifiers (SIDs) used in a SR policy implemented to resolve the constraint violation.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein provide tactical Traffic Engineering (TE) using Segment Routing (SR) policies. In one or more embodiments, tactical network optimization for achieving Service Level Agreements (SLAs) (e.g., contracts between providers and customers that guarantee specific levels of performance and reliability at a certain cost) are built on a scalable collection of network topology, real-time notifications of network change events, and algorithms designed for segment routing.

As described in detail below, one or more embodiments allow networks to automatically (or semi-automatically) mitigate failure induced SLA violations such as link congestion due to network failure, prolonged maintenance, or traffic surge, in near real time. A combination of real-time traffic monitoring via the collection of a Segment Routing Demand Matrix (SRDM) may be used along with an algorithmic optimization operating on the SRDM that computes a minimal number of "shallow" SR policies (e.g., limit number of SIDs (Segment Identifiers)) resolving the SLA violations. In one embodiment, an orchestration platform may be used to deploy desired segment routing policies in the network.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the example shown in FIG. 1, networks 10 and 12 are in communication with a Traffic Engineering (TE) system 14. In one example, network 10 comprises a Data Center operating with BGP (Border Gateway Protocol) SR and network 12 comprises a WAN (Wide Area Network) operating with IGP (Interior Gateway Protocol) SR. Each network 10, 12 may include any number of nodes (16a, 16b, 16c, 16d, 16e, 16f, 16g, 16h, 16i, 16j, 16k), which may comprise routers or any other network devices configured to perform routing functions. Each network may include any number of edge routers (e.g., PE nodes) (16f, 16g), core routers (e.g., P nodes), or virtual routers (e.g., vPE). Each network may include any number of links 15 connecting the nodes and providing any number of communication paths for communication with another node (e.g., 16l in network 17). The links connecting networks 12 and 17 may comprise, for example, a low latency, low bandwidth link and a high latency, high bandwidth link. In one example, nodes 16a, 16b, or 16c in the data center 10 may be in communication with a database, server, group of servers or any other device operable to provide data to one or more nodes (e.g., node 16l in network 17).

The TE system 14 is operable to provide tactical TE to address specific problems (e.g., hot-spots) that occur in the network from a tactical perspective, generally without consideration of overall strategic imperatives. Tactical TE may be used, for example, as a short term solution to fix a sudden peak traffic load. As described below, the TE system 14 may use an optimization that computes a minimal number of "shallow" segment routing policies (e.g., limit number of SIDs (Segment Identifiers) used to implement a path for a policy) to resolve SLA violations. The TE system 14 may be used for example, by Web and Tier 1 service providers, ISPs (Internet Service Providers), enterprise customers, or any other user or entity that does not want to deploy complicated RSVP-TE based solutions.

Referring again to FIG. 1, networks 10 and 12 are segment routing networks (i.e., SR enabled networks). One or more nodes are configured to perform segment routing, which specifies a path that a packet will take through the network using a stack of Segment Identifiers (SIDs). The segment IDs may be a prefix SID or an adjacency SID. The prefix SID contains an IP address prefix calculated by an IGP in a provider core network and is globally unique. A node SID is a special form of prefix SID that contains the loopback address of the node as the prefix. The adjacency SID contains an advertising router's adjacency to a neighbor and is a link between two routers. Since the adjacency SID is relative to a specific router, it is locally significant. Segment ID stacks correspond to respective segment paths. Individual segment IDs in a segment ID stack may correspond to respective segments or sub-paths of a corresponding segment path.

A node steers a packet through a controlled set of instructions called segments by prepending the packet with a SR header. The segments act as topological sub-paths that can be combined together to form the desired path. Each segment contains multiple segment IDs that direct the data along a specified path. Traffic typically flows through the shortest path between a source and destination, allowing for ECMP (Equal Cost Multi-Path). The SR nodes may advertise routing information including nodal segment IDs bound to loopbacks, adjacency segment IDs mapped to link IDs, and the like, using protocols such as IGP (Interior Gateway Protocol) or BGP (Border Gateway Protocol) with SR extensions. Nodes may use the routing information they receive to create or update SR forwarding tables and may communicate with the TE system 14 (e.g., either directly or via another node) to provide traffic and topology information, and topology change events (e.g., via BGP-LS (Link State)), as shown in FIG. 1.

Real-time traffic monitoring may be provided by the collection of a Segment Routing Demand Matrix (SRDM). The SRDM may include, for example, a traffic matrix (also referred to as a demand matrix or traffic demand matrix) that describes traffic flows that enter, traverse, and leave a network. Each demand may be a single traffic matrix entry that identifies the amount of traffic that enters the network at one point and leaves the network at another point. A demand represents traffic flowing between any two nodes in the network and may be a single element (cell) of the demand matrix associated with a source and destination in the network. There may be any number of traffic flows across the network. Traffic measurements may be mapped to individual demands. The SRDM comprises a demand matrix computed based on SR attributes.

In one embodiment, the TE system 14 includes a data collector 18 for collection of traffic information (e.g., SRDM) via a scalable means that provides visibility and awareness into what is occurring on the network at any time. Collection may be performed by telemetry, which provides for faster data collection and increased reactivity. Data may also be collected by other means such SNMP (Simple Network Management Protocol).

As noted above, topology information may be received via BGP-LS. Topology information may comprise the physical structure of the network and its internal configurations. The SR enabled networks may be monitored in real-time (or near real-time). Upon receiving an event notification (e.g., any change in network topology or network traffic, or time-based traffic prediction of network changes), traffic engineering may be performed by the TE system 14 as needed to avoid congestion.

Memory 19 is provided to store the collected and received network information including SRDM and topology information. Topology information may be stored, for example, in a TE topology database that is synchronized with the network. Memory 19 may comprise any number of databases or other type of data structures and may reside on a network node (e.g., with other components of the TE system) or on a server located in the same network or another network.

The TE system 14 may further include a network modeling engine 20 for use in combining the traffic information (e.g., SRDM) and topology information (e.g., BGP-LS notifications) to generate a network model. A richer network model may be built by collecting additional network parameters. The network modeling engine 20 may be a physical appliance, virtual appliance, router-integrated service module, or any other virtual or physical node operable to combine topology and traffic information to create a network model.

In one or more embodiments, a user interface 21 (e.g., Graphical User Interface (GUI) or other interface tool) is provided for receiving input from an operator defining constraints (e.g., SLA constraints, parameters, objectives). Parameters may include, for example, latency limits or topological constraints (e.g., traffic may not leave the country). SLA objectives may include, for example, maximum utilization per link, per class, etc. In one embodiment, a Domain Specific Language (DSL) may be defined for specifying network constraints. Input from an operator may be detailed to address any number or type of parameters, constraints, or objectives, or may simply comprise selection of a predefined SLA constraint or policy.

An optimization engine 22 utilizes the received constraints and topology and traffic information in an optimization algorithm. As described in detail below, the algorithm is specifically designed for use with segment routing and its ability to utilize ECMPs (Equal Cost Multi-Paths) in the network, and minimizing the number policies needed to meet the defined constraints. The optimization algorithm may be used, for example, to optimize segment routing in order to meet an operator's policies or objectives or typical service provider SLA constraints.

In one embodiment, the algorithm is based on efficient deterministic heuristics aimed at minimizing the number of policies and restricting the number of SIDs (Segment Identifiers) of each policy to a maximum of two. Thus, rendering the output of the algorithm easy to understand by an operator.

The optimization engine 22 may comprise, for example, a Wide Area Network (WAN) Automation (Application) Engine (WAE) (also referred to as a WAN Orchestration Engine), a Path Computation Engine (PCE), or any other orchestration tool, module, device, application, engine, or system operable to implement algorithms described herein. For example, WAN orchestration (e.g., stateful PCE) may be used to monitor network topology and traffic and orchestrate a routing policy (e.g., SR policy) to maintain a set of SLA objectives. It is to be understood that these are only examples, and that other devices or applications may be used for the optimization engine. The optimization engine 22 may be used to compute network paths based on network information (e.g., topology, paths, segments, traffic demands, bandwidth). Path computation clients may be used to send path state updates to a PCE. The optimization engine 22 may be located at a router, server, or virtualized entity running in a cloud, for example.

In one or more embodiments, the TE system 14 further includes a deployment module (framework) 23 operable to instantiate the computed policies in the network. As described below, implementation of policies may be automated or semi-automated in which operator input may be provided.

The TE system 14 may operate at a network device (e.g., physical device, virtual device, group of physical or virtual devices, controller, network management system, server, router, dedicated computational platform) or be distributed among any number of nodes in one or more networks. As noted above, elements of the TE system 14 may operate as a component or application on a stand-alone product (e.g., WAN Automation Engine (WAE) or device that functions as a PCE (Path Computation Engine)) or on different nodes or networks, and may operate in a virtualized or cloud environment.

Traffic Engineering may be triggered at the TE system 14 when a traffic or topology variation leads to congestion. This may include, for example, a link or node failure, increase in bandwidth usage, or any other change in topology that results in congestion in the network. In one embodiment, the TE system 14 may be used to find a smallest set of demands that can be routed off of their current path to eliminate congestion, and then compute a path for each of the demands and instantiate traffic engineered policies in the network.

Figure 2:
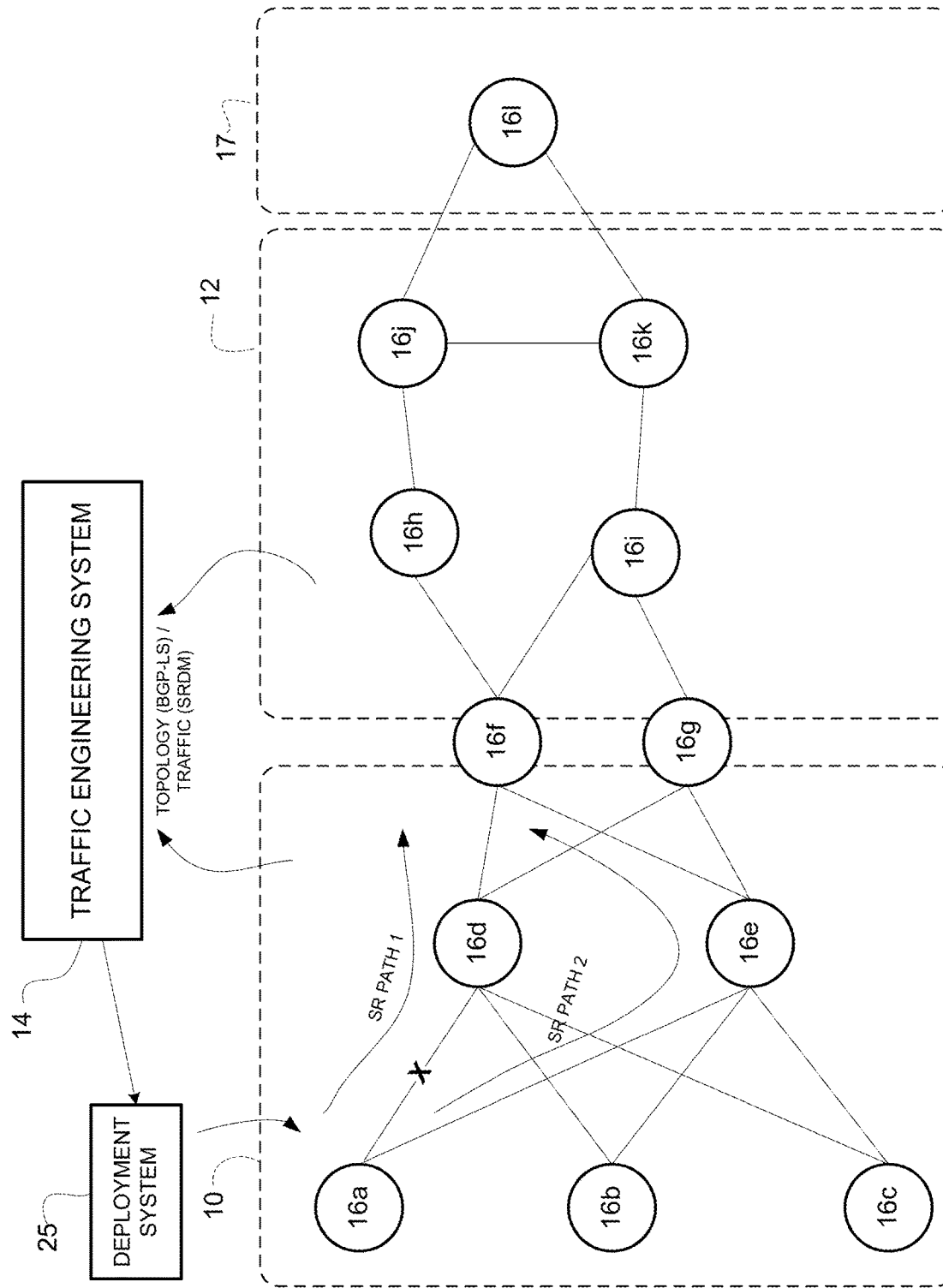
FIG. 2 illustrates an example of a failure induced constraint violation in the network of FIG. 1.

Segment routing for TE takes place through a TE tunnel between a source and destination pair. FIG. 2 illustrates a simplified example in which traffic passing over a first SR path (SR Path 1) is moved to a second SR path (SR Path 2) following a failure in a link in the first SR path, based on optimization of the network according to an optimization algorithm described herein. The TE system 14 may input the traffic and topology information in the optimization algorithm in order to generate an SR policy, and based on the SR policy, move traffic originally on link SR Path 1 to SR Path 2, as shown in FIG. 2. In another example, there may be two or more links between nodes 16a and 16d, with one link failure resulting in congestion. As described below, there may be a plurality of demands passing through the congested link and the optimization described herein may be used to move only some of the demands (e.g., one or more of the plurality of demands) to an alternate path to eliminate congestion and resolve the SLA violation. In one embodiment, the number of SIDs used to implement the alternate path is limited to two.

As shown in FIG. 2, a deployment system 25 instantiates the generated SR policies in the network. Deployment may be done via device configuration with orchestration systems such as NSO (Network Services Orchestration) or dynamically using a PCEP (Path Computation Element Protocol), or by any other suitable means. As noted above the deployment system 25 may operate at the same network device as other components of the TE system 14 or as an application running on a stand-alone device.

It is to be understood that the network devices and topologies shown in FIGS. 1 and 2, and described above are only examples and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 3:
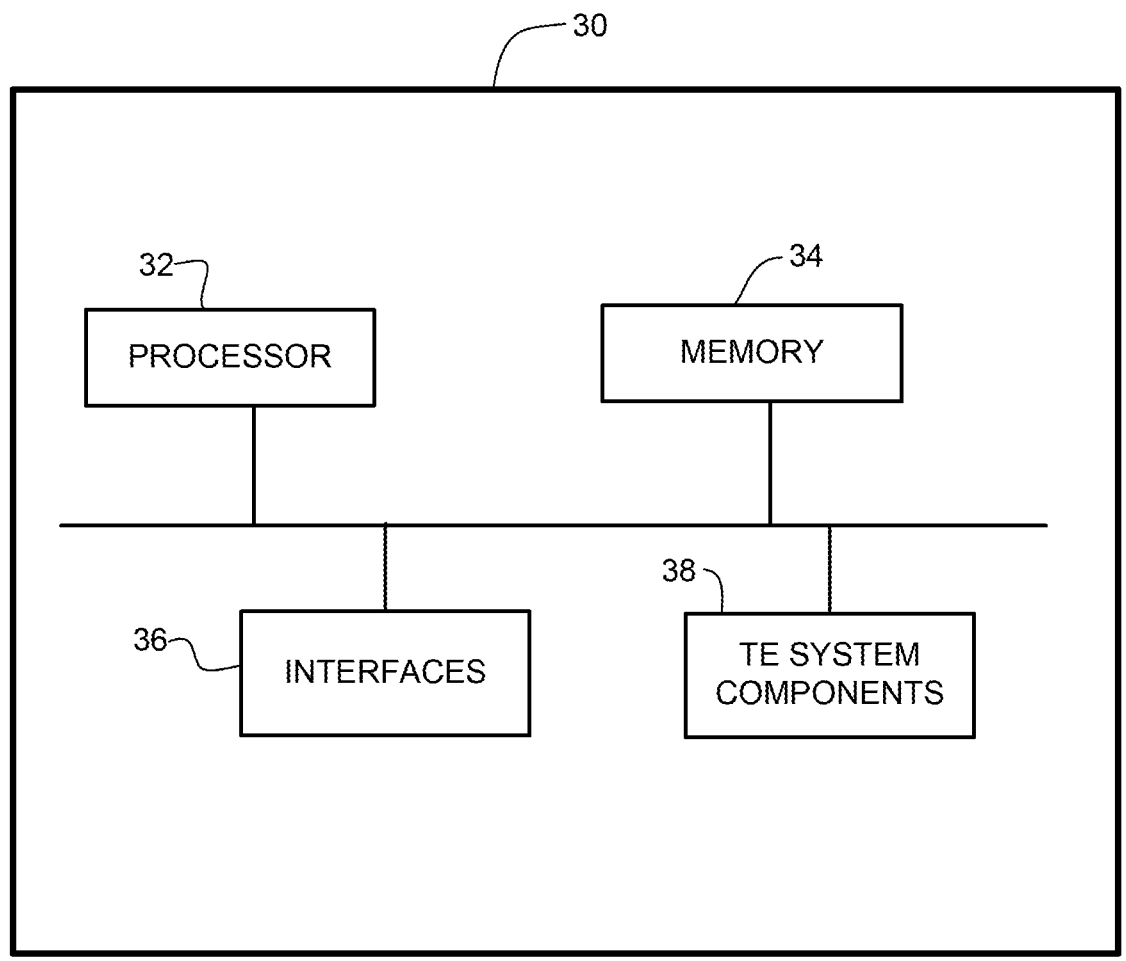
FIG. 3 depicts an example of a network device useful in implementing embodiments described herein.

FIG. 3 illustrates an example of a network device 30 that may be used to implement the embodiments described herein. In one embodiment, the network device 30 is a programmable machine that may be implemented in hardware, software, or any combination thereof. The network device 30 includes one or more processor 32, memory 34, network interfaces 36, and TE system components 38 (e.g., objects, modules, mechanisms, software, code, firmware, and the like, that are used conjunctively to accomplish traffic engineering objectives).

Memory 34 may be a volatile memory or non-volatile storage, which stores various applications, operating systems, modules, and data for execution and use by the processor 32. For example, TE system components 38 (e.g., code, logic, database, etc.) may be stored in the memory 34. Memory 34 may also include an SR database, routing table (e.g., routing information base (RIB)), forwarding table (e.g., forwarding information base (FIB)), TE topology database, or any other data structure for use in routing or forwarding packets or orchestrating traffic engineering. The network device 30 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 30 may include any number of processors 32. The processor 32 may be used, for example, to perform one or more steps described below with respect to the flowcharts of FIGS. 4 and 5.

The network interfaces 36 may comprise any number of interfaces (linecards, ports) for receiving data or transmitting data to other devices. The network interfaces 36 may include, for example, an Ethernet interface for connection to a computer or network.

It is to be understood that the network device 30 shown in FIG. 3 and described above is only an example and that different configurations of network devices may be used. For example, the network device 30 may further include any suitable combination of hardware, software, algorithms, processors, devices, modules, components, or elements operable to facilitate the capabilities described herein.

Figure 4:
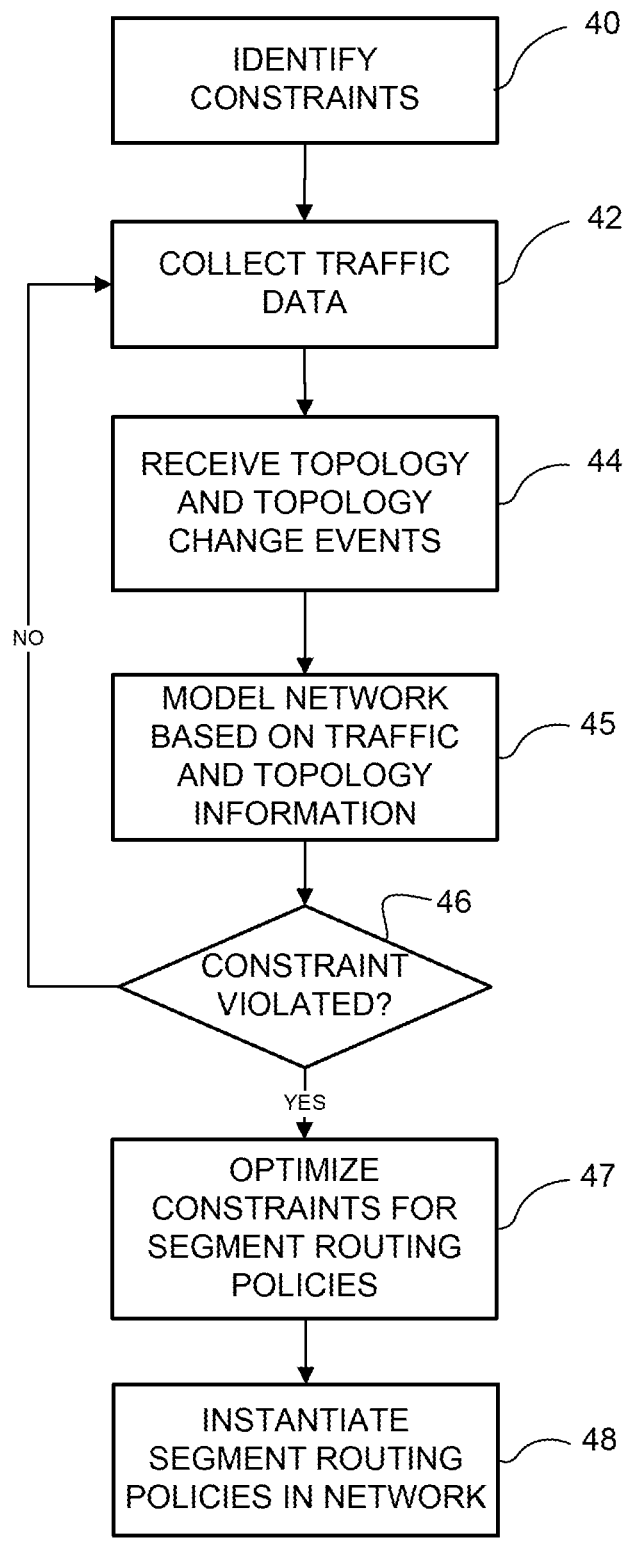
FIG. 4 is a flowchart illustrating an overview of a process for Traffic Engineering (TE) via Segment Routing (SR) policies, in accordance with one embodiment.

FIG. 4 is a flowchart illustrating a process for tactical traffic engineering using segment routing policies, in accordance with one embodiment. At step 40, the TE system is configured based on network constraints (e.g., SLA constraints, network parameters, objectives, etc.). An operator may configure the system using a Domain Specific Language (DSL) or any other input means using any type of user interface to specify constraints. Traffic is monitored and data is collected (e.g., SRDM) (step 42) and topology information is received (step 44) so that the system may discover topology and traffic in one or more SR networks. The traffic and topology information is used to model the network (step 45). For example, the network modeling engine 20 shown in FIG. 1 may build a model of the network from the topology collected via BGP-LS and populate the model with traffic based on demands calculated from the SRDM. Significant network events received (e.g., via BGP-LS notifications) may trigger optimization of the network according to an optimization algorithm based on a constraint violation (steps 46 and 47). A deployment framework may then instantiate desired segment routing policies in the network (step 48). For example, SLA constraints may be optimized for SR and SR policies instantiated in the network to provide automated (or semi-automated) tactical Traffic Engineering via the SR policies.

Figure 5:
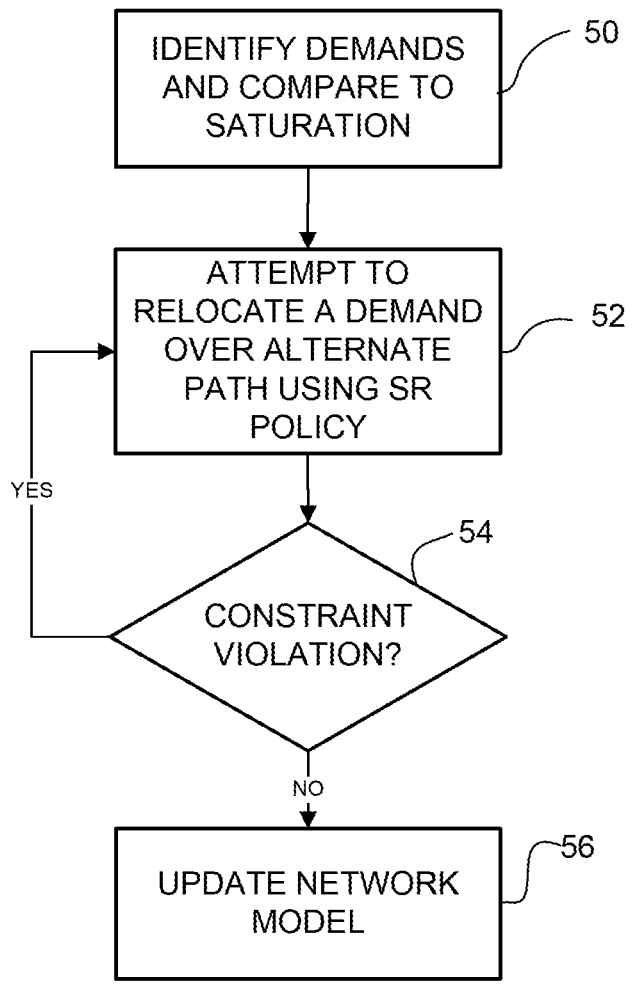
FIG. 5 is a flowchart illustrating a process for SR optimization of constraints, in accordance with one embodiment.

FIG. 5 illustrates details of an optimization process of step 47 in FIG. 4, in accordance with one embodiment. The TE system 14 may first identify the smallest demand larger than an amount of saturation (e.g., difference between current link utilization and target link utilization) and the demands smaller than the amount of saturation (step 50). The TE system 14 may then attempt to relocate a demand over one or more alternate paths using an SR policy (step 52). In one embodiment, alternate paths from the source of the demand are considered, using a small label stack (e.g., one or two SIDs) to reach the destination of the demand. This may be done by decreasing order of amount of bandwidth carried by the demands identified in step 50. Step 52 may be repeated until no more constraint violations occur on the saturated link (step 54). The network model may then be updated (step 56). As described below, the network is monitored for changes in traffic, and demands previously placed on alternate paths may be put back on their normal forwarding path (original shortest path) once the policy violations would no longer occur.

It is to be understood that the processes shown in FIGS. 4 and 5 and described above are only examples and that steps may be added, removed, or modified, without departing from the scope of the embodiments.

As previously described, the optimization algorithm for SR optimization of constraints is designed specifically for use with SR, its ability to utilize ECMPs in the network, and minimize the number of policies needed to meet SLA constraints. The algorithm may further be configured to be tactical, fast, and effective since an objective of the algorithm is to bring back the network to an acceptable state after an event leading to an SLA violation. There is no need however to reach a theoretical optimum state, as such an objective is strategic and may require solving an NP (Non-deterministic Polynomial) hard problem.

For ease of acceptance as an automated tool, the algorithm may be configured to move as few demands as possible to reach the objective on alternate paths while providing acceptable bounds of overhead in terms of latency and the number of SIDs (Segment Identifiers) used to implement the path. In one embodiment, the above criteria may be met using the following algorithmic approach.

First, the smallest demand larger than the amount of saturation (difference between current link utilization and target link utilization), and the demands smaller than the amount of saturation are considered, as described above with respect to the process flowchart of FIG. 5.

Second, by decreasing order of amount of bandwidth carried by the demands identified in the first step, an attempt may be made to relocate a demand over one or more alternate paths using an SR policy. This process may be repeated until no more SLA violations occur on the saturated link. This approach tends to minimize the number of demands that will be moved away from the path defined by the IGP.

The following describes an example of a process for relocation of an individual demand, in accordance with one embodiment.

All alternate paths from the source of the demand are considered using a single SID or a combination of two SIDs to reach the destination of the demand, in decreasing order of either available capacity on the path, latency, or IGP distance. These paths are naturally ECMP enabled as per the use of prefix SIDs.

The choice between favoring available capacity, latency, or IGP distance may be defined as a parameter. If available capacity is preferred, the allowed alternate paths may still be limited to those not violating latency bounds specified for the demand. In all cases, the allowed alternate paths may be limited to those such that placing the demand on them would not lead to SLA violation on the links forming the alternate paths. Thus, a demand is only moved on a path in a way that does not create an SLA violation somewhere else in the network.

Optionally, a demand may be placed onto multiple alternate paths, in which case the demand placing exercise is repeated for equally sized fractions of the demand. This is preferably not a default behavior as this behavior may not be needed to solve practical cases, as load balancing is already obtained through the use of prefix SIDs to encode an alternate path.

If a valid alternate path is found, the demand may be moved on that alternate path, and the network model updated accordingly. If the SLA violation has not been solved yet, the process may proceed with the next demand.

When multiple links suffer from SLA violations at the same time, the algorithm may attempt to reduce saturation on the most congested link first. At each step of the procedure, the identity of the most congested link may be re-evaluated.

In one embodiment, the TE system continuously monitors the network in order to realize if demands previously placed on alternate paths can be put back on the normal shortest paths, as the network would no longer suffer from policy violations. This behavior may be applied in a self-paced manner so that demand re-allocation does not oscillate. Evaluation of demands for this behavior and actually putting a demand back onto its normal shortest paths may be applied by increasing order of bandwidth, in order to maximize the number of demands that are forwarded on their regular shortest paths, at any point in time.

As previously noted with respect to FIG. 2, deployment may be performed via device configuration using an orchestration system such as NSO or dynamically using a protocol such as PCEP. The use of an orchestration platform benefits the optimization techniques in two ways. First, in fully automated fashion, the platform automatically reacts to observing an SLA violation by computing and instantiating the necessary SR policies. Second, in semi-automated mode, the computed SR policies are presented to the operator or queued for approval before deployment. Allowing for this second mode of operation may be desired as operators may be hesitant to use automated optimization tools affecting the operation of their live network. This approach can thus be used as a first step of deployment until the operator observes that the behavior suggested by the tool is acceptable, with regard to its non-formalized views on the operation of the network.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    monitoring traffic in a Segment Routing (SR) network through collection of a Segment Routing Demand Matrix (SRDM) at a Traffic Engineering (TE) system operating at a network device;
    receiving topology information for the SR network at the TE system;
    modeling the SR network based on said topology information and said SRDM at the TE system;
    identifying a constraint violation in the SR network at the TE system; and
    running an optimization algorithm for SR optimization of constraints in the SR network at the TE system, wherein said SR optimization comprises limiting a number of Segment Identifiers (SIDs) used in a SR policy implemented to resolve said constraint violation;
    wherein running said optimization algorithm comprises relocating at least one demand using one or two SIDs in said SR policy.

2. The method of claim 1 wherein identifying said violation comprises receiving a BGP-LS (Border Gateway Protocol Link State) notification.

3. The method of claim 1 wherein said constraints comprise SLA (Service Level Agreement) constraints.

4. The method of claim 1 further comprising instantiating said SR policy in the SR network.

5. The method of claim 4 wherein instantiating said SR policy comprises deployment of a TE tunnel utilizing an orchestration platform.

6. The method of claim 1 wherein limiting a number of SIDs used in said SR policy comprises limiting the number of SIDs to two.

7. The method of claim 1 wherein running said optimization algorithm comprises identifying a smallest demand larger than an amount of saturation on a congested link and demands smaller than the amount of saturation.

8. The method of claim 7 wherein running said optimization algorithm further comprises attempting to relocate one or more of said identified demands over an alternate path.

9. The method of claim 1 wherein relocating at least one demand comprises relocating said demand based on available capacity, latency, or IGP (Interior Gateway Protocol) distance.

10. The method of claim 1 further comprising moving said demand back when said constraint will no longer be violated.

11. An apparatus comprising:
    interfaces for receiving traffic and topology information in a Segment Routing (SR) network;
    memory for storing said traffic and topology information including traffic demands calculated from a Segment Routing Demand Matrix (SRDM);
    a processor for modeling the SR network based on topology information and said SRDM, identifying a constraint violation in the SR network, running an optimization algorithm for SR optimization of constraints in the SR network, and relocating a demand to resolve said constraint violation and moving said demand back when said constraint will no longer be violated;
    wherein said SR optimization comprises limiting a number of Segment Identifiers (SIDs) used in a SR policy implemented to resolve said constraint violation.

12. The apparatus of claim 11 wherein the processor is further operable to instantiate said SR policy in the SR network.

13. The apparatus of claim 11 wherein limiting a number of SIDs used in said SR policy comprises limiting the number of SIDs to two.

14. The apparatus of claim 11 wherein running said optimization algorithm comprises identifying a smallest demand larger than an amount of saturation on a congested link and demands smaller than the amount of saturation, and relocating one or more of said identified demands to resolve said constraint violation.

15. The apparatus of claim 11 wherein running said optimization algorithm comprises relocating at least one demand using one or two SIDs in said SR policy.

16. One or more non-transitory computer readable media storing logic, which when executed by a processor performs the following:
   monitor traffic in a Segment Routing (SR) network through collection of a Segment Routing Demand Matrix (SRDM) at a Traffic Engineering (TE) system;
   process topology information for the SR network at the TE system;
   model the SR network based on said topology information and said SRDM at the TE system;
   identify a constraint violation in the SR network at the TE system;
   run an optimization algorithm for SR optimization of constraints in the SR network at the TE system, wherein said SR optimization comprises limiting a number of Segment Identifiers (SIDs) used in a SR policy implemented to resolve said constraint violation to two; and
   instantiate said SR policy in the SR network through deployment of a TE tunnel.

17. The one or more non-transitory computer readable media of claim 16 further storing additional logic, which when executed by a processor performs the following:
   identify a smallest demand larger than an amount of saturation on a congested link and demands smaller than the amount of saturation and relocate one or more of said identified demands over an alternate path utilizing the SR policy that resolves said constraint violation.

18. The one or more non-transitory computer readable media of claim 16 wherein said constraint is resolved by relocating at least one demand based on available capacity, latency, or IGP (Interior Gateway Protocol) distance.

19. The one or more non-transitory computer readable media of claim 16 further operable to relocate a demand to resolve said constraint violation and move said demand back when said constraint will no longer be violated.

20. The one or more non-transitory computer readable media of claim 16 wherein said constraint violation is identified upon receiving a BGP-LS (Border Gateway Protocol Link State) notification.

* * * * *